US012617710B2

(12) United States Patent
Fu et al.

(10) Patent No.: US 12,617,710 B2
(45) Date of Patent: May 5, 2026

(54) GLASS COMPOSITIONS WITH IMPROVED BIOACTIVITY

(71) Applicant: Corning Incorporated, Corning, NY (US)

(72) Inventors: Qiang Fu, Painted Post, NY (US); Aize Li, Painted Post, NY (US); Charisse Marye Spier, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 739 days.

(21) Appl. No.: 17/980,955

(22) Filed: Nov. 4, 2022

(65) Prior Publication Data

US 2023/0133219 A1 May 4, 2023

Related U.S. Application Data

(60) Provisional application No. 63/275,507, filed on Nov. 4, 2021.

(51) Int. Cl.
*C03C 3/087* (2006.01)

(52) U.S. Cl.
CPC .................................... *C03C 3/087* (2013.01)

(58) Field of Classification Search
CPC ....... C03C 3/087; C03C 4/0007; C03C 3/062; C03C 3/097; C03C 4/0021
See application file for complete search history.

(56) References Cited

U.S. PATENT DOCUMENTS

| | | |
|---|---|---|
| 4,234,972 A | 11/1980 | Hench |
| 4,358,541 A | 11/1982 | Andrus et al. |
| 4,643,982 A | 2/1987 | Kasuga et al. |
| 4,783,429 A | 11/1988 | Shibuya et al. |
| 4,820,660 A | 4/1989 | Mohri et al. |
| 4,960,733 A | 10/1990 | Kasuga et al. |
| 5,074,916 A | 12/1991 | Hench et al. |
| 6,197,429 B1 | 3/2001 | Lapp et al. |
| 6,200,137 B1 | 3/2001 | Hoeland et al. |
| 7,090,720 B2 | 8/2006 | Kessler et al. |
| 8,515,625 B2 | 8/2013 | Watanabe |
| 8,715,625 B1 | 5/2014 | Rokitowski et al. |
| 8,741,269 B2 | 6/2014 | Mandadi et al. |
| 9,238,044 B2 | 1/2016 | Da et al. |
| 9,937,365 B2 | 4/2018 | Chopra et al. |
| 10,285,916 B2 | 5/2019 | Sagel et al. |
| 10,500,142 B2 | 12/2019 | Schankel et al. |
| 11,724,957 B2 | 8/2023 | Fu |
| 2009/0208428 A1 | 8/2009 | Hill et al. |
| 2011/0244430 A1 | 10/2011 | Gibson et al. |
| 2012/0020899 A1 | 1/2012 | Zaidel et al. |
| 2012/0148646 A1 | 6/2012 | Stark et al. |
| 2013/0171220 A1 | 7/2013 | Hill et al. |
| 2014/0193499 A1 | 7/2014 | Da et al. |
| 2015/0297500 A1 | 10/2015 | Robinson et al. |
| 2017/0174555 A1 | 6/2017 | Danielson et al. |
| 2021/0047233 A1 | 2/2021 | Fu et al. |
| 2021/0093534 A1 | 4/2021 | Strand et al. |
| 2021/0179484 A1 | 6/2021 | Beall et al. |
| 2021/0220242 A1 | 7/2021 | Hodgkinson |
| 2022/0009822 A1 | 1/2022 | Fu |
| 2022/0220022 A1 | 7/2022 | Coon et al. |
| 2022/0241165 A1 | 8/2022 | Drake et al. |
| 2023/0045516 A1 | 2/2023 | Chiang et al. |
| 2023/0133219 A1 | 5/2023 | Fu et al. |
| 2023/0227350 A1 | 7/2023 | Coon et al. |
| 2024/0140854 A1 | 5/2024 | Fu et al. |

FOREIGN PATENT DOCUMENTS

| | | |
|---|---|---|
| CN | 109476532 A | 3/2019 |
| CN | 109771319 A | 5/2019 |
| DE | 3806215 A1 | 9/1988 |
| EP | 2695623 B1 | 5/2020 |
| FR | 2612918 A1 | 9/1988 |
| GB | 2199027 A | 6/1988 |
| JP | 61-197446 A | 9/1986 |
| JP | 06-039031 A | 2/1994 |
| JP | 2009-120998 A | 6/2009 |
| WO | 95/21799 A1 | 8/1995 |
| WO | 97/49643 A1 | 12/1997 |
| WO | 2012/137158 A1 | 10/2012 |
| WO | 2020/236501 A1 | 11/2020 |
| WO | 2021/119043 A2 | 6/2021 |
| WO | 2022/005781 A1 | 1/2022 |
| WO | 2022/136870 A1 | 6/2022 |
| WO | 2022/182544 A1 | 9/2022 |
| WO | 2022/187214 A1 | 9/2022 |

OTHER PUBLICATIONS

Aina, V., et al., "On the dissolution/reaction of small-grain Bioglass® 45S5 and F-modified bioactive glasses in artificial saliva (AS)". Applied Surface Science, 2011. 257(9): pp. 4185-4195.

Boccaccini et al., "Bioactive glasses beyond bone and teeth: emerging applications in contact with soft tissues". Acta Biomaterialia, 2015. 13: pp. 1-15.

Cochrane, N., et al., "New approaches to enhanced remineralization of tooth enamel". Journal of Dental Research, 2010. 89(11): pp. 1187-1197.

GBD 2017 Disease and Injury Incidence and Prevalence Collaborators; "Global, regional, and national incidence, prevalence, and years lived with disability for 354 diseases and injuries for 195 countries and territories, 1990-2017: a systematic analysis for the Global Burden of Disease Study 2017". Lancet (London, England), 2018. 392(10159): pp. 1789-1858.

Hench, L.L., "Bioceramics". Journal of the American Ceramic Society, 1998. 81(7): pp. 1705-1728.

Jia, W., et al., "Glass-activated regeneration of volumetric muscle loss". Acta Biomaterialia, 2019, pp. 306-317.

Rahaman, M.N., et al., "Bioactive glass in tissue engineering". Acta Biomater, 2011. 7(6): pp. 2355-2373.

(Continued)

*Primary Examiner* — Benjamin L Utech

(74) *Attorney, Agent, or Firm* — Travis B. Gasa

(57) ABSTRACT

A silicate-based glass composition includes 15-65 wt. % $SiO_2$, 15-50 wt. % CaO, 1-30 wt. % $P_2O_5$, and 1-20 wt. % $ZrO_2$, such that the composition has a hydrolytic resistance of glass grains (HGB) of at most 3, when measured by International Organization for Standardization section 719 (ISO 719), and forms a bioactive crystalline phase in simulated body fluid.

20 Claims, 5 Drawing Sheets

(56) References Cited

OTHER PUBLICATIONS

Robinson, C., et al., "The chemistry of enamel caries". Critical Reviews in Oral Biology & Medicine, 2000. 11(4): pp. 481-495.

Wheeler, D.L., et al., "Effect of bioactive glass particle size on osseous regeneration of cancellous defects". Journal of biomedical materials research, 1998. 41(4): pp. 527-533.

Wheeler, D.L., et al., "Evaluation of particulate Bioglass® in a rabbit radius ostectomy model". Journal of biomedical materials research, 1997. 35(2): pp. 249-254.

Featherstone, J.D., "The science and practice of caries prevention". The Journal of the American dental association, 2000. 131(7): pp. 887-899.

Generosi, A., et al., "Crystallization process of carbonate substituted hydroxyapatite nanoparticles in toothpastes upon physiological conditions: An in situ time-resolved X-ray diffraction study". Journal of Materials Science: Materials in Medicine, 2010. 21(2): pp. 445-450.

Gerth, H.U., et al., "A three layer structure model of fluoridated enamel containing CaF2, Ca (OH) 2 and FAp". Dental Materials, 2007. 23(12): pp. 1521-1528.

Hill et al., "The ability of a nano hydroxyapatite toothpaste and oral rinse containing fluoride to protect enamel during an acid challenge using 19F solid state NMR spectroscopy". Materials Letters, 2015. 156: pp. 69-71.

Moreno et al., "Fluoridated hydroxyapatite solubility and caries formation". Nature, 1974. 247(5435): pp. 64-65.

Zaidel et al.. "Anti-hypersensitivity mechanism of action for a dentifrice containing 0.3% triclosan. 2.0% PVM/MA copolymer. 0.243% NaF and specially-designed silica", American Journal of Dentistry. vol. 24. Special Issue A. Jul. 2011, pp. 6A-13A.

Zhang et al.. "Biomimetic regulation of dentine remineralizationby amino acid in vitro", Dental Materials. 2018 [retrieved on May 15, 2024]. Retrieved from the internet: <URL: https://www.sciencedirect.com/science/article/abs/pii/S01095641 118304524 ?via%3Dihub>. pp. 1-12.

Zhong et al.. "Effect of a novel bioactive glass-ceramic on dentinal tubule occlusion: an in vitro study", Australian Dental Journal. vol. 60. 2015, pp. 96-103.

Balamurugan et al., "Sol gel derived SiO2—CaO—MgO—P2O5 bioglass system—Preparation and in vitro characterization", Wiley Interscience, Apr. 2007, pp. 546-553.

Hench, Larry L., "Bioceramics", Journal of the American Ceramic Society, vol. 81, No. 7, 1998, pp. 1705-1728.

Jia et al., "Glass-Activated Regeneration of Volumetric Muscle Loss", Acta Biomaterialia, vol. 103, Feb. 2020, pp. 306-317.

Miguez-Pacheco et al., "Bioactive Glasses Beyond Bone And Teeth: Emerging Applications In Contact With Soft Tissues", Acta Biomaterialia, vol. 13, Feb. 2015, pp. 1-15.

Rahaman et al., "Bioactive Glass in Tissue Engineering". Acta Biomaterialia, 2011, vol. 7, No. 6, pp. 2355-2373.

Wheeler et al., "Effect of Bioactive Glass Particle Size on Osseous Regeneration of Cancellous Defects", Journal of Biomedical Materials Research, 1998, vol. 41, No. 4, pp. 527-533.

Wheeler et al., "Evaluation of Particulate Bioglass® in a Rabbit Radius Ostectomy Model", Journal of Biomedical Materials Research, 1997, vol. 35, No. 2, pp. 249-254.

Aspinall et al., "Oral Care Product Formulations, Properties and Challenges", Colloids Surf. B Biointerfaces 2021, 200, 111567.

Berg et al., "Comparative Study of Technologies for Tubule Occlusion and Treatment of Dentin Hypersensitivity", J. Funct. Biomater. 2021, 12 (2), 27.

Grohe, B.; Mittler, S. "Advanced Non-Fluoride Approaches to Dental Enamel Remineralization: The next Level in Enamel Repair Management", Biomater. Biosyst. 2021, 4, 100029.

Hare et al., "Immediate and Durable Effects of an Oxalate Strip on Human Dentin In Vitro", Compend. Contin. Educ. Dent. Jamesburg NJ 1995 2016, 37, pp. e6-e12.

James et al., Global, regional, and national incidence, prevalence, and years lived with disability for 354 diseases and injuries for 195 countries and territories, 1990-2017: a systematic analysis for the Global Burden of Disease Study 2017. Lancet (London, England), 2018. 392(10159): pp. 1789-1858.

Larsen et al., "Saturation of human saliva with respect to calcium salts," Archives of oral biology, vol. 48, No. 4, pp. 317-322, 2003.

Li et al., "The Remineralisation of Enamel: A Review of the Literature", J. Dent. 2014, 42 Suppl 1, pp. S12-20.

Papas et al., "Caries clinical trial of a remineralising toothpaste in radiation patients," Gerodontology, vol. 25, No. 2, pp. 76-88, 2008.

Petrou et al., "A Breakthrough Therapy for Dentin Hypersensitivity: How Dental Products Containing 8% Arginine and Calcium Carbonate Work to Deliver Effective Relief of Sensitive Teeth", J. Clin. Dent. 2009, 20 (1), pp. 23-31.

Selwitz et al., "Dental caries," The Lancet, vol. 369, No. 9555, pp. 51-59, 2007.

Shiau, H.J., "Dentin Hypersensitivity", Journal of Evidence Based Dental Practice, 2012. 12(3): pp. 220-228.

Tao, J., et al., "Roles of amorphous calcium phosphate and biological additives in the assembly of hydroxyapatite nanoparticles", Journal of Physical Chemistry B, 2007. 111(47): pp. 13410-13418.

Vranic et al., "Formulation Ingredients for Toothpastes and Mouthwashes", Bosn. J. Basic Med. Sci. 2004, 4 (4), pp. 51-58.

Walsh, L. "Contemporary Technologies for Remineralisation Therapies", A Review. 2009, 11, 9 pages.

Yanyan, S., et al., "Effects of amino acids on conversion of calcium carbonate to hydroxyapatite", RSC Advances, 2020. 10: pp. 37005-37013.

International Search Report and Written Opinion of the International Searching Authority; PCT/US2022/048541; mailed on Mar. 14, 2023, 12 pages; European Patent Office.

Yin Ping et al., "Effect of ZrO2on the bioactivity properties of gel-derived CaO—P2O5—SiO2—SrO glasses", Ceramics International, vol. 43, No. 13, Apr. 2017, pp. 9691-9698.

GLASS COMPOSITIONS WITH IMPROVED BIOACTIVITY

CROSS REFERENCE TO RELATED APPLICATION

This application claims the benefit of priority under 35 U.S.C. § 119 of U.S. Provisional Application Ser. No. 63/275,507 filed on Nov. 4, 2021, the content of which is relied upon and incorporated herein by reference in its entirety.

FIELD

This disclosure generally relates to glass compositions, and more particularly to bioactive glass compositions for consumer and dental applications.

BACKGROUND

Bioactive glasses are a group of glass and glass ceramic materials that have shown biocompatibility or bioactivity, which has allowed them to be incorporated into human or animal physiology. Generally speaking, bioactive glasses are able to bond with hard and soft tissues, thereby fostering growth of bone and cartilage cells. Moreover, bioactive glasses may also enable release of ions which activate expression of osteogenic genes and stimulate angiogenesis, as well as promote vascularization, wound healing, and cardiac, lung, nerve, gastrointestinal, urinary tract, and laryngeal tissue repair.

Currently available bioactive glasses are being investigated for their ability to convert to apatite; however, the low chemical durability of these traditional bioactive glasses are problematic for compositions requiring prolonged shelf times in aqueous environments. For example, 45S5 Bioglass® requires development of a non-aqueous environment for glass particulates to be used in toothpaste applications. Other glass compositions (e.g., alkali-free glasses) do not exhibit the bioactivity of alkali-containing compositions. Thus, there continues to be an unmet need for bioactive glass compositions having high bioactivity while remaining chemically durable in aqueous environments.

This disclosure presents glass compositions with improved bioactivity for consumer and dental applications.

SUMMARY

In embodiments, a silicate-based glass composition comprises 15-65 wt. % $SiO_2$, 15-50 wt. % CaO, 1-30 wt. % $P_2O_5$, and 1-20 wt. % $ZrO_2$, wherein the composition: has a hydrolytic resistance of glass grains (HGB) of at most 3, when measured by International Organization for Standardization section 719 (ISO 719), and forms a bioactive crystalline phase in simulated body fluid.

In aspects, which are combinable with any of the other aspects or embodiments, the glass composition comprises: 15-45 wt. % $SiO_2$, 30-60 wt. % CaO, 8-30 wt. % $P_2O_5$, and 2-15 wt. % $ZrO_2$. In aspects, which are combinable with any of the other aspects or embodiments, the glass composition further comprises >0-25 wt. % MgO. In aspects, which are combinable with any of the other aspects or embodiments, the glass composition further comprises 3-15 wt. % MgO. In aspects, which are combinable with any of the other aspects or embodiments, the glass composition further comprises >0-25 wt. % SrO. In aspects, which are combinable with any of the other aspects or embodiments, the glass composition further comprises 10-20 wt. % SrO. In aspects, which are combinable with any of the other aspects or embodiments, the glass composition further comprises >0-25 wt. % ZnO. In aspects, which are combinable with any of the other aspects or embodiments, the glass composition further comprises 10-20 wt. % ZnO. In aspects, which are combinable with any of the other aspects or embodiments, the glass comprises: 15-50 wt. % MO, and 0-30 wt. % $R_2O$, wherein MO is the sum of MgO, CaO, SrO, BeO, and BaO, and $R_2O$ is the sum of $Na_2O$, $K_2O$, $Li_2O$, $Rb_2O$, and $Cs_2O$.

In aspects, which are combinable with any of the other aspects or embodiments, the bioactive crystalline phase comprises apatite. In aspects, which are combinable with any of the other aspects or embodiments, the apatite is hydroxyapatite. In aspects, which are combinable with any of the other aspects or embodiments, a sum of $P_2O_5$ and CaO is from 25-65 wt. %. In aspects, which are combinable with any of the other aspects or embodiments, the simulated body fluid is an artificial saliva.

In embodiments, a silicate-based glass composition comprises 15-45 wt. % $SiO_2$, 30-60 wt. % CaO, 8-30 wt. % $P_2O_5$, and 2-15 wt. % $ZrO_2$, wherein the composition: has a hydrolytic resistance of glass grains (HGB) of at most 3, when measured by International Organization for Standardization section 719 (ISO 719), and forms an apatite crystalline phase in an artificial saliva, and wherein a sum of $P_2O_5$ and CaO is from 25-65 wt. %.

In aspects, which are combinable with any of the other aspects or embodiments, the glass composition further comprises 3-15 wt. % MgO. In aspects, which are combinable with any of the other aspects or embodiments, the glass composition further comprises 10-20 wt. % SrO. In aspects, which are combinable with any of the other aspects or embodiments, the glass composition further comprises 10-20 wt. % ZnO. In aspects, which are combinable with any of the other aspects or embodiments, the apatite is hydroxyapatite.

In aspects, which are combinable with any of the other aspects or embodiments, a matrix comprises a glass composition disclosed herein, wherein: the glass composition is attached to the matrix or mixed therein, and the matrix includes at least one of: a toothpaste, mouthwash, rinse, spray, ointment, salve, cream, bandage, polymer film, oral formulation, pill, capsule, or transdermal formulation. In aspects, which are combinable with any of the other aspects or embodiments, an aqueous environment comprises a glass composition disclosed herein.

BRIEF DESCRIPTION OF THE DRAWINGS

The disclosure will become more fully understood from the following detailed description, taken in conjunction with the accompanying figures, in which.

Figure 1A:
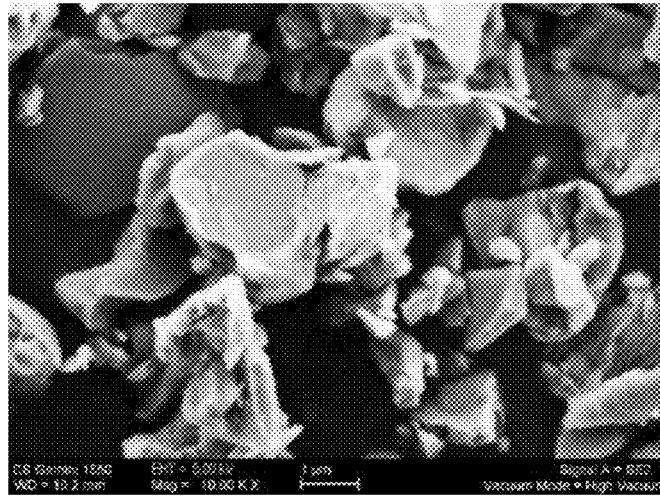
FIGS. 1A-1I illustrate scanning electron microscopy (SEM) images of Example Composition 9 after one day (FIGS. 1A-1C), four days (FIGS. 1D-1F), and seven days (FIGS. 1G-1I) in artificial saliva, according to embodiments. Samples were dried and sputter coated with a conductive carbon before SEM analysis.

3 soaking in artificial saliva for various times, according to embodiments. Samples were dried and ground before XRD analysis.

DETAILED DESCRIPTION

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass that is "free" or "essentially free" of $Al_2O_3$ is one in which $Al_2O_3$ is not actively added or batched into the glass, but may be present in very small amounts as a contaminant (e.g., 500, 400, 300, 200, or 100 parts per million (ppm) or less or).

Herein, glass compositions are expressed in terms of wt. % amounts of particular components included therein on an oxide bases unless otherwise indicated. Any component having more than one oxidation state may be present in a glass composition in any oxidation state. However, concentrations of such component are expressed in terms of the oxide in which such component is at its lowest oxidation state unless otherwise indicated.

Oral diseases pose a major health burden worldwide, causing pain, discomfort, disfigurement, and even death. The dissolution of apatite crystals and the net loss of calcium, phosphate, and other ions from the tooth (i.e., demineralization) leads to dental caries formation. Caries can be managed non-invasively through a remineralization process, in which calcium and phosphate ions are supplied from an external source to the tooth to promote crystal deposition into voids in demineralized enamel. Calcium phosphate phases in both crystalline form (brushite, β-tricalcium phosphate, octocalcium phosphate, hydroxyapatite, fluorapatite and enamel apatite) and amorphous form have been used in remineralization processes. Use of amorphous calcium phosphate (e.g., bioactive glass) in remineralization processes has shown promising results. There is a strong desire to develop new glass compositions that promote the remineralization process to prevent or repair tooth caries.
Glass Compositions Bioactive glasses are a group of glass and glass ceramic materials that have shown biocompatibility or bioactivity, which has allowed them to be incorporated into human or animal physiology. In the glass compositions described herein, $SiO_2$ serves as the primary glass-forming oxide in combination with the bioactive oxides of calcium and phosphorous.

In examples, the glass comprises a combination of $SiO_2$, CaO, and $P_2O_5$. In examples, the glass further comprises $ZrO_2$. In examples, the glass further also comprises MgO, SrO, and/or ZnO. In examples, the glass further comprises $Li_2O$, $Na_2O$, $K_2O$, and/or $F^-$. In some examples, the glass may further comprise $Al_2O_3$ and/or $B_2O_3$.

For example, the glass may comprise a composition including, in wt. %: 15-65% $SiO_2$, 15-60% CaO, and 1-30% $P_2O_5$. In examples, the glass further comprises, in wt. %, 1-20% $ZrO_2$. In examples, the glass further also comprises, in wt. %, 0-25% MgO, 0-25% SrO, and/or 0-25% ZnO.

In examples, the glass may comprise a composition including, in wt. %: 15-45% $SiO_2$, 30-60% CaO, and 8-30% $P_2O_5$. In examples, the glass further comprises, in wt. %, 2-15% $ZrO_2$. In examples, the glass further also comprises, in wt. %, 3-15% MgO. In examples, the glass further also comprises, in wt. %, 10-20% SrO. In examples, the glass further also comprises, in wt. %, 10-20% ZnO.

In examples, the glass may further comprise in wt. %: 0-10% $Li_2O$, 0-10% $Na_2O$, 0-10% $K_2O$, and/or 0-5% $F^-$. In examples, the glass may further comprise, in wt. %: 0-10% $Al_2O_3$ and/or 0-5% $B_2O_3$. In examples, the glass comprises, in wt. %: 15-50 MO and 0-30 $R_{2O}$, wherein MO is the sum of MgO, CaO, SrO, BeO, and BaO and $R_2O$ is the sum of $Li_2O$, $Na_2O$, $K_2O$, $Rb_2O$, and $Cs_2O$. The silicate glasses disclosed herein are particularly suitable for consumer, dental, or bioactive applications.

The bioactivity is influenced by the composition of the glass.

Silicon dioxide ($SiO_2$), which serves as the primary glass-forming oxide component of the embodied glasses, may be included to provide high temperature stability and chemical durability. For the glasses disclosed herein, compositions including excess $SiO_2$ (e.g., greater than 60 wt. %) suffer from decreased bioactivity. Moreover, glasses containing too much $SiO_2$ often also have too high melting temperatures (e.g., greater than 200 poise temperature).

In some embodiments, the glass can comprise 15-65 wt. % $SiO_2$. In some examples, the glass may comprise 20-55 wt. % $SiO_2$. In some examples, the glass can comprise 15-65 wt. %, or 15-55 wt. %, or 20-55 wt. %, or 20-50 wt. %, or 25-50 wt. %, or 25-45 wt. %, or 30-45 wt. %, or 30-40 wt. %, or any value or range disclosed therein. In some examples, the glass comprises 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt. % $SiO_2$, or any value or range having endpoints disclosed herein.

Phosphorus pentoxide ($P_2O_5$) also serves as a network former. Furthermore, the liberation of phosphate ions to the surface of bioactive glasses contributes to the formation of apatite. Apatite is an inorganic mineral in bone and teeth, and formation of apatite in a simulated body fluid is one criteria for a material to be bioactive, according to ASTM F1538-03 (2017). In some examples, simulated body fluid may include a salt solution comprising NaCl, $NaHCO_3$, KCl, $K_2HPO_4$, $MgCl_2$-$6H_2O$, $CaCl_2$, $NaSO_4$, ($CH_2OH_3$) $CNH_2$ in nano-pure water, with pH adjusted with acid, such as HCl. In some examples, the simulated body fluid comprises artificial saliva. The inclusion of phosphate ions in the bioactive glass increases apatite formation rate and the binding capacity of the hard tissues (e.g., bone, tooth, etc.). In addition, $P_2O_5$ increases the viscosity of the glass, which in turn expands the range of operating temperatures, and is therefore an advantage to the manufacture and formation of the glass. In some examples, the glass can comprise 1-30 wt. % $P_2O_5$. In some examples, the glass can comprise 5-25 wt. % $P_2O_5$. In some examples, the glass can comprise 1-30 wt. %, or 3-30 wt. %, or 3-27 wt. %, or 5-27 wt. %, or 5-25 wt. %, or 7-25 wt. %, or 7-23 wt. % $P_2O_5$, or any value or range disclosed therein. In some examples, the glass can comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 wt. % $P_2O_5$, or any value or range having endpoints disclosed herein.

In some examples, the glass can comprise 15-60 wt. % CaO. In some examples, the glass can comprise 25-45 wt. % CaO. In some examples, the glass can comprise from 15-60 wt. %, or 20-50 wt. %, or 20-45 wt. %, or 25-45 wt. %, or 25-40 wt. % CaO, or any value or range disclosed therein. In some examples, the glass can comprise 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 wt. % CaO, or any value or range having endpoints disclosed herein.

Divalent cation oxides (such as alkaline earth oxides and ZnO) improve the melting behavior, chemical durability, and bioactivity of the glass. Particularly, CaO is found to be able to react with $P_2O_5$ to form apatite when immersed in a simulated body fluid (SBF) or in vivo. The release of $Ca^{2+}$ ions from the surface of the glass contributes to the formation of a layer rich in calcium phosphate. Thus, the combination of $P_2O_5$ and CaO may provide advantageous compositions for bioactive glasses. In examples, the glass compositions comprise $P_2O_5$ and CaO with the sum of $P_2O_5$ and CaO being from 25-65 wt. %, or 25-60 wt. %, or 30-60 wt. %, or 30-55 wt. %, or 35-55 wt. %, or any value or range disclosed therein. In examples, the glass compositions comprise $P_2O_5$ and CaO with the sum of $P_2O_5$ and CaO being 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt. %, or any value or range having endpoints disclosed herein.

Zirconium dioxide ($ZrO_2$) may also be present and serves to function as a network former or intermediate in precursor glasses, as well as a key oxide for improving glass thermal stability by significantly reducing glass devitrification during forming and lowering liquidus temperature. In aspects, $ZrO_2$ may play a similar role as alumina ($Al_2O_3$) in the composition. Alumina may influence (i.e., stabilize) the structure of the glass and improve mechanical properties and chemical durability. In examples, $Al_2O_3$ may lower liquidus temperature and coefficient of thermal expansion, or, enhance the strain point. In addition to its role as a network former, $Al_2O_3$ (and $ZrO_2$) help improve the chemical durability and mechanical properties in silicate glass while having no toxicity concerns. Too high a content of $Al_2O_3$ or $ZrO_2$ (e.g., >20 wt. %) generally increases the viscosity of the melt and decreases bioactivity. In examples, the glass can comprise 0-10 wt. % $ZrO_2$ and/or $Al_2O_3$. In examples, the glass can comprise from 10-20 wt. %, 15-20 wt. %, 10-15 wt. %, 0-10 wt. %, 0-8 wt. %, 0-6 wt. %, 0-4 wt. %, 0-2 wt. %, >0-10 wt. %, >0-8 wt. %, >0-6 wt. %, >0-4 wt. %, >0-2 wt. %, 1-10 wt. %, 1-8 wt. %, 1-6 wt. %, 1-4 wt. %, 1-2 wt. %, 3-8 wt. %, 3-6 wt. %, 3-10 wt. %, 5-8 wt. %, 5-10 wt. %, 7-10 wt. %, or 8-10 wt. % $ZrO_2$ and/or $Al_2O_3$, or any value or range disclosed therein. In some examples, the glass can comprise 0, >0, 1, 2, 3, 4, 5, 6, 7, 8, 9, 10, 11, 12, 13, 14, 15, 16, 17, 18, 19, or 20 wt. % $ZrO_2$ and/or $Al_2O_3$, or any value or range having endpoints disclosed herein.

In some examples, the glasses comprise MgO. In examples, the glass can comprise 0-25 wt. % MgO. In examples, the glass can comprise 3-15 wt. % MgO. In examples, the glass can comprise from 0-25 wt. %, or 2.5-22.5 wt. %, or 5-22.5 wt. %, or 5-20 wt. %, or 7.5-20 wt. %, or 7.5-17.5 wt. %, or 10-17.5 wt. %, or 10-15 wt. % MgO, or any value or range disclosed therein. In examples, the glass can comprise 0, >0, 1, 2, 3, 4, 5, 6, 7, 8, 9, 10, 11, 12, 13, 14, 15, 16, 17, 18, 19, 20, 21, 22, 23, 24, or 25 wt. % MgO, or any value or range having endpoints disclosed herein. The inclusion of MgO can improve liquidus of the precursor glass to avoid devitrification during forming.

Strontium oxide (SrO) may be present in embodiments and in such examples, the glass can comprise from 0-25 wt. % SrO. In examples, the glass can comprise from 10-20 wt. % SrO. In examples, the glass can comprise from 0-25 wt. %, or 2.5-22.5 wt. %, or 5-22.5 wt. %, or 5-20 wt. %, or 7.5-20 wt. %, or 7.5-17.5 wt. %, or 10-17.5 wt. %, or 10-15 wt. % SrO, or any value or range disclosed therein. In examples, the glass can comprise 0, >0, 1, 2, 3, 4, 5, 6, 7, 8, 9, 10, 11, 12, 13, 14, 15, 16, 17, 18, 19, 20, 21, 22, 23, 24, or 25 wt. % SrO, or any value or range having endpoints disclosed herein. The inclusion of SrO can improve liquidus of the precursor glass to avoid devitrification during forming. Moreover, SrO also enters the structure of apatite to improve bioactivity.

In examples, the glasses comprise ZnO. In examples, the glass can comprise 0-25 wt. % ZnO. In examples, the glass can comprise from 10-20 wt. % ZnO. In examples, the glass can comprise from 0-25 wt. %, or 2.5-22.5 wt. %, or 5-22.5 wt. %, or 5-20 wt. %, or 7.5-20 wt. %, or 7.5-17.5 wt. %, or 10-17.5 wt. %, or 10-15 wt. % ZnO, or any value or range disclosed therein. In examples, the glass can comprise 0, >0, 1, 2, 3, 4, 5, 6, 7, 8, 9, 10, 11, 12, 13, 14, 15, 16, 17, 18, 19, 20, 21, 22, 23, 24, or 25 wt. % ZnO, or any value or range having endpoints disclosed herein. The inclusion of ZnO can improve liquidus of the precursor glass to avoid devitrification during forming. Moreover, ZnO also enters the structure of apatite to improve bioactivity.

Alkaline earth oxides may improve other desirable properties in the materials, including influencing the Young's modulus and the coefficient of thermal expansion. In examples, the glass comprises from 15-50 wt. % MO, wherein MO is the sum of MgO, CaO, SrO, BeO, and BaO. In examples, the glass comprises 15-45 wt. %, or 20-45 wt. %, or 20-40 wt. %, or 25-40 wt. % MO, or any value or range disclosed therein. In examples, the glass can comprise about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt. % MO, or any value or range having endpoints disclosed herein.

Alkali oxides ($Na_2O$, $K_2O$, $Li_2O$, $Rb_2O$, or $Cs_2O$) serve as aids in achieving low melting temperature and low liquidus temperatures. Meanwhile, the addition of alkali oxides can improve bioactivity. In examples, the glass can comprise a total of 0-30 wt. % $Na_2O$, $K_2O$, $Li_2O$, $Rb_2O$, and $Cs_2O$ combined. In examples, the glass can comprise from 0-10 wt. % $Li_2O$ and/or $Na_2O$ and/or $K_2O$ to achieve high glass chemical durability. In examples, the glass can comprise >0-10 wt. % $Li_2O$ and/or $Na_2O$ and/or $K_2O$. In examples, the glass can comprise about 0, >0, 1, 2, 3, 4, 5, 6, 7, 8, 9, or 10 wt. % $Li_2O$ and/or $Na_2O$ and/or $K_2O$, or any value or range having endpoints disclosed herein.

Fluorine ($F^-$) may be present in embodiments and in such examples, the glass can comprise from 0-5 wt. % $F^-$. In examples, the glass can comprise from >0-5 wt. % $F^-$. In examples, the glass can comprise from 0-5 wt. %, >0-5 wt. %, >0-4 wt. %, >0-3 wt. %, >0-2.5 wt. %, >0-2 wt. %, $F^-$, or any value or range disclosed therein. In examples, the glass can comprise about 0, >0, 0.5, 1, 1.5, 2, 2.5, 3, 3.5, 4, %, 0 to 0.5 wt. %, 0 to 0.1 wt. %, 0 to 0.05 wt. %, or 0 to 0.01 wt. % ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The glasses, according to examples, can also include various contaminants associated with batch materials and/or introduced into the glass by the melting, fining, and/or forming equipment used to produce the glass. For example, in embodiments, the glass can comprise from 0 to about 3 wt. %, 0 to about 2 wt. %, 0 to about 1 wt. %, 0 to about 0.5 wt. %, 0 to about 0.1 wt. %, 0 to about 0.05 wt. %, or 0 to about 0.01 wt. % $SnO_2$ or $Fe_2O_3$, or combinations thereof.

EXAMPLES

The embodiments described herein will be further clarified by the following examples.

Example 1—Compositions

Non-limiting examples of amounts of precursor oxides for forming the embodied glasses are listed in Table 1, along with the properties of the resulting glasses. The annealing point (° C.) may be measured using a beam bending viscometer (ASTM C598-93).

TABLE 1

| Oxide | | Comp. Ex. | | | | | | | | | | | |
|---|---|---|---|---|---|---|---|---|---|---|---|---|---|
| (wt. %) | | 1 | 2 | 3 | 4 | 5 | 6 | 7 | 8 | 9 | 10 | 11 | 12 |
| $SiO_2$ | 45.0 | 39.5 | 39.5 | 39.5 | 39.5 | 39.5 | 39.5 | 37.5 | 34.5 | 29.5 | 24.5 | 24.5 | 20.5 |
| $Na_2O$ | 24.5 | 0 | 0 | 0 | 0 | 0 | 0 | 0 | 0 | 0 | 0 | 0 | 0 |
| MgO | 0 | 0 | 4.5 | 9.5 | 14.5 | 0 | 0 | 4.5 | 4.5 | 4.5 | 4.5 | 4.5 | 4.5 |
| CaO | 24.5 | 47 | 42.5 | 37.5 | 32.5 | 32.5 | 32.5 | 42.5 | 42.5 | 42.5 | 42.5 | 42.5 | 42.5 |
| SrO | 0 | 0 | 0 | 0 | 0 | 14.5 | 0 | 0 | 0 | 0 | 0 | 0 | 0 |
| ZnO | 0 | 0 | 0 | 0 | 0 | 0 | 14.5 | 0 | 0 | 0 | 0 | 0 | 0 |
| $P_2O_5$ | 6.0 | 9.5 | 9.5 | 9.5 | 9.5 | 9.5 | 9.5 | 11.5 | 14.5 | 19.5 | 24.5 | 22.5 | 22.5 |
| $ZrO_2$ | 0 | 4 | 4 | 4 | 4 | 4 | 4 | 4 | 4 | 4 | 4 | 6 | 10 |
| Density | 2.71 | 3.03 | 2.96 | 2.95 | 2.99 | 3.18 | 3.15 | 2.98 | 2.99 | 3.03 | 3.12 | 3.16 | 3.26 |
| Anneal Pt (° C.) | 514.8 | 759.1 | 743.2 | 738.3 | 757.3 | 729.2 | 687.0 | 738.0 | 730.2 | 717.6 | 702.2 | 805.9 | 704.3 |
| Refractive index, $n_d$ | 1.562 | 1.639 | 1.638 | 1.630 | 1.620 | 1.632 | 1.635 | 1.647 | 1.634 | 1.628 | 1.623 | 1.634 | 1.653 |

4.5, or 5 wt. % $F^-$, or any value or range having endpoints disclosed herein. $F^-$ can combine with CaO and $P_2O_5$ to form fluorapatite to improve the bioactivity of the claimed compositions. Fluorapatite is an inorganic mineral in dental enamel. The ability to form fluorapatite can help regeneration the enamel due to cavities.

In examples, the glass can comprise 0-5 wt. % $B_2O_3$. In examples, the glass can comprise >0-5 wt. % $B_2O_3$. In examples, the glass can comprise from 0-5 wt. %, or >0-5 wt. %, or 2-5 wt. % $B_2O_3$, or any value or range disclosed therein. In examples, the glass can comprise 0, >0, 1, 2, 3, 4, or 5 wt. % $B_2O_3$, or any value or range having endpoints disclosed herein.

Additional components can be incorporated into the glass to provide additional benefits or may be incorporated as contaminants typically found in commercially-prepared glass. For example, additional components can be added as coloring or fining agents (e.g., to facilitate removal of gaseous inclusions from melted batch materials used to produce the glass) and/or for other purposes. In examples, the glass may comprise one or more compounds useful as ultraviolet radiation absorbers. In examples, the glass can comprise 3 wt. % or less ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In examples, the glass can comprise from 0 to about 3 wt. %, 0 to about 2 wt. %, 0 to about 1 wt.

The bioactive glass compositions disclosed herein (e.g., Table 1) exhibit significantly higher chemical durability and excellent bioactivity, as compared to currently available glasses, and can be in any form that is useful for the medical and dental processes disclosed. In embodiments, the compositions of Table 1 demonstrate significantly higher chemical durability and bioactivity over Comparative Example (45S5 glass).

The compositions can be in the form of, for example, particles, powder, microspheres, fibers, sheets, beads, scaffolds, woven fibers, or other form depending on the application. The compositions of Table 1 may be melted at temperatures below 1600° C., or at temperatures below 1400° C., or at temperatures below 1200° C., thereby making it possible to melt in relatively small commercial glass tanks.

Example 2—Improved Bioactivity

Figure 1B:
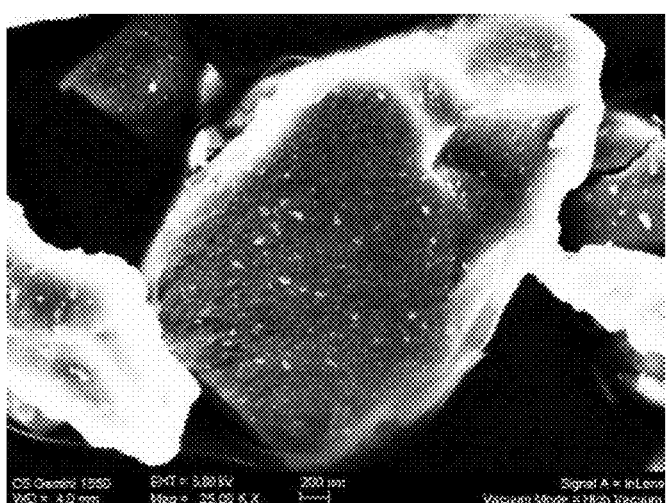
Figure 1C:
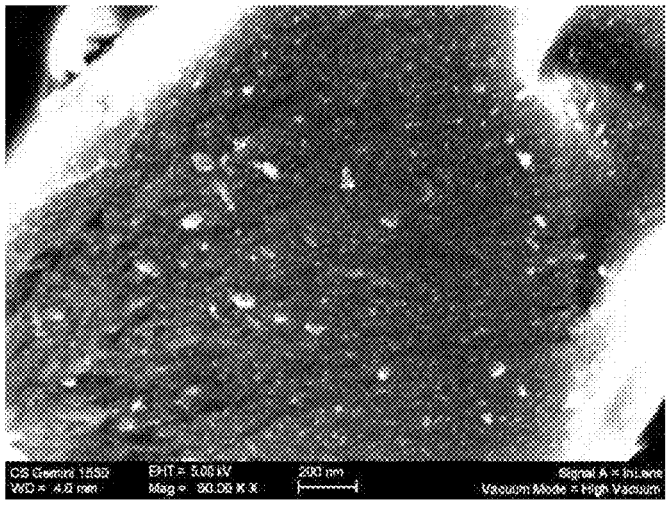
Figure 1D:
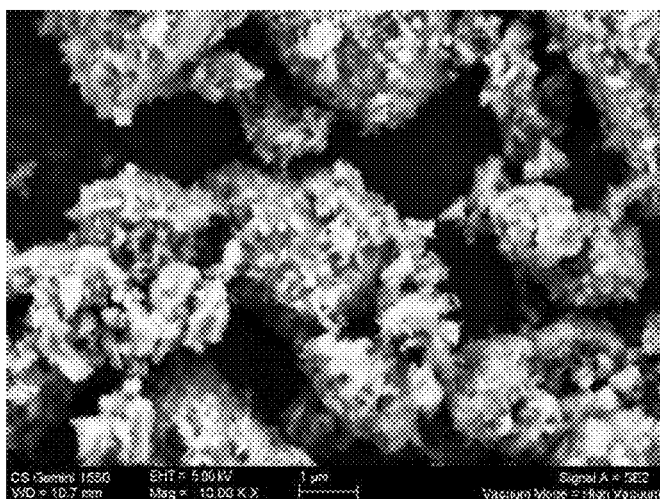
Figure 1E:
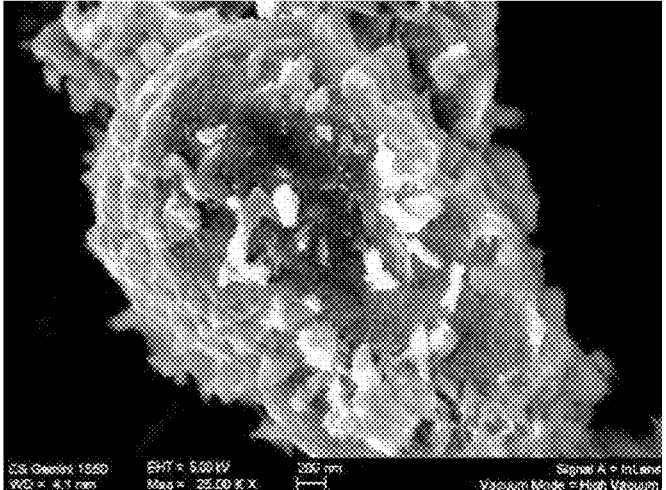
Figure 1F:
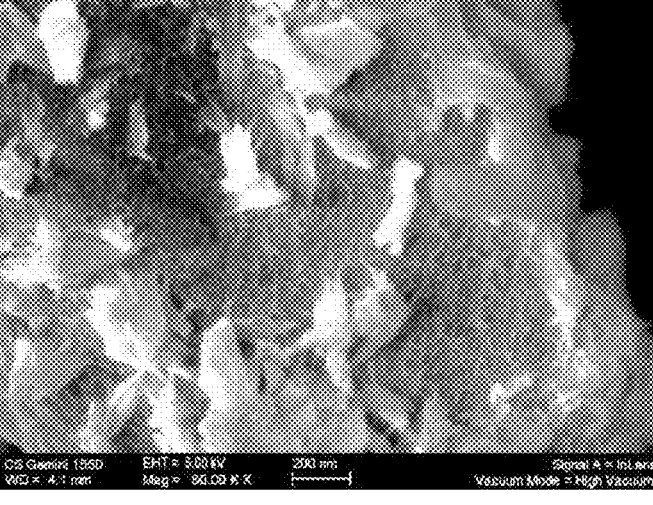
Figure 1G:
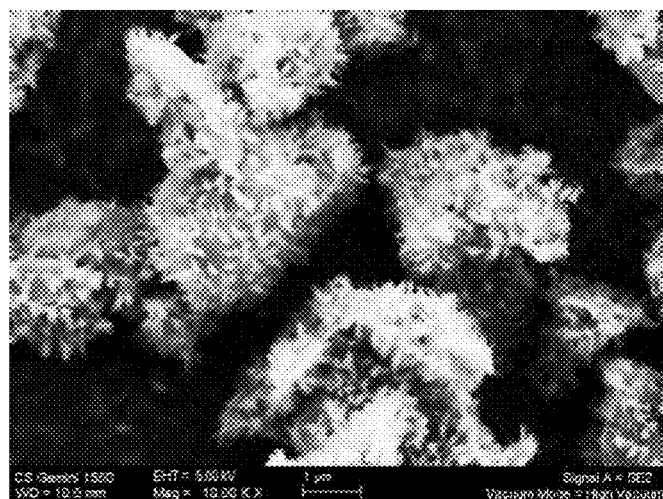
Figure 1H:
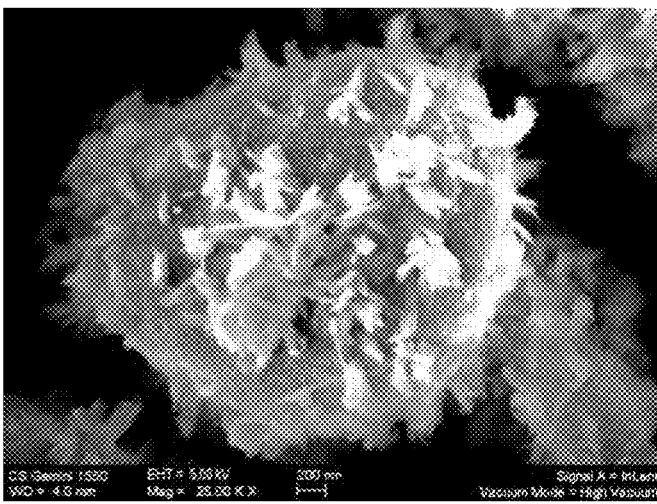
Figure 1I:
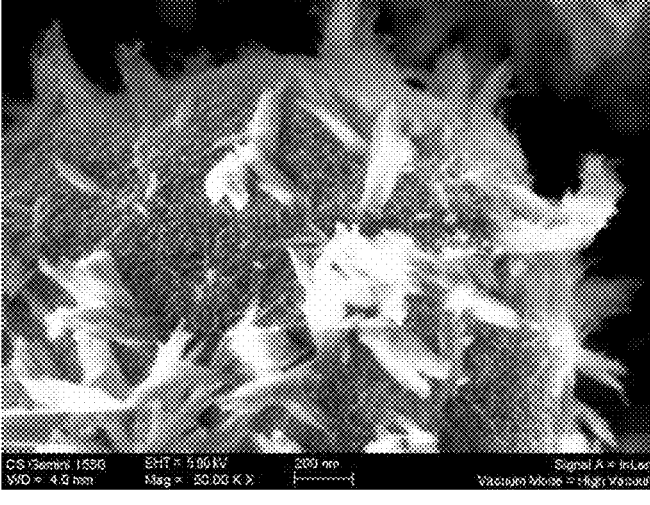

FIGS. 1A-1I illustrate scanning electron microscopy (SEM) images of Example Composition 9 after one day (FIGS. 1A-1C), four days (FIGS. 1D-1F), and seven days (FIGS. 1G-1I) in artificial saliva. In embodiments, the compositions of Table 1 exhibit remarkably high bioactivity, at least ten times higher than Comparative Example. For example, within a very short time—one day after soaking in artificial saliva—a surface reaction layer was observed in Example Composition 9 (FIGS. 1A-1C). The surface layer may result from a hydrolytic reaction with the glass. No clear crystalline morphology is observed at one day. After four days (FIGS. 1D-1F), Example Composition 9 was covered with a well-developed crystalline phase. Combined with XRD, the well-developed crystalline phase is determined to be apatite, which is different from the surface reaction layer formed at one day. After seven days (FIGS. 1G-1I), Example Composition 9 shows higher quantities of crystals of larger size.

Figure 3:
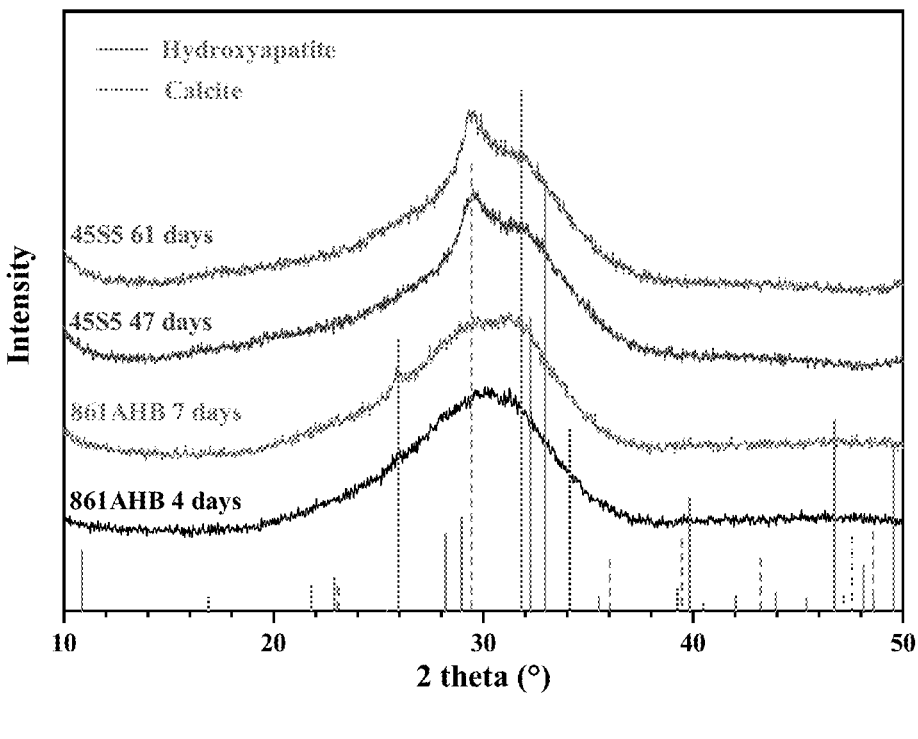
FIG. 3 illustrates powder x-ray diffraction (XRD) analysis of Example Composition 9 and Comparative Example after

FIG. 3 illustrates powder x-ray diffraction (XRD) analysis of Example Composition 9 and Comparative Example after soaking in artificial saliva for various times. Combining the SEM studies of FIGS. 1A-1I with the XRD results of FIG. 3, the crystal growth shown after 4 and 7 days was determined to be hydroxyapatite. Depending on the ions in the reaction media and in the glass composition, fluorapatite, chlorapatite or hydrocarbon apatite can be formed. As explained above, apatite is an inorganic mineral in bone and teeth, and the formation thereof in a simulated body fluid is one criteria for a material to be bioactive (ASTM F1538-03, 2017). The presence of apatite ensures the formation of a direct bond with physiological features, such as bone or teeth, and is an indication of the bioactivity of an implanted material.

Figure 2A:
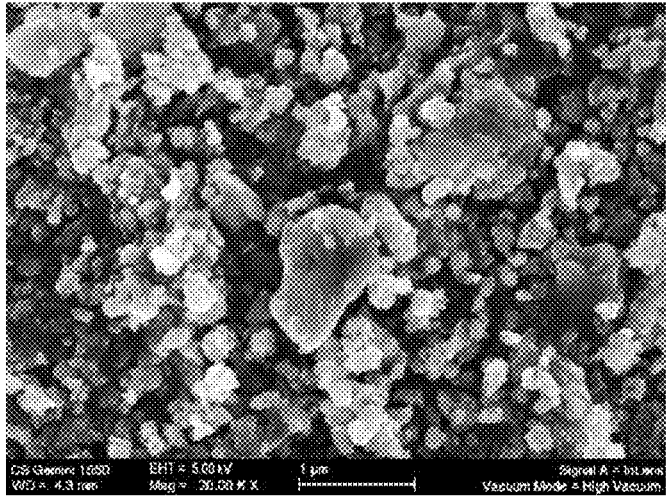
FIGS. 2A and 2B illustrate SEM images of Comparative Example after soaking in artificial saliva for 47 days, according to embodiments. Samples were dried and sputter coated with a conductive carbon before SEM analysis.
Figure 2B:
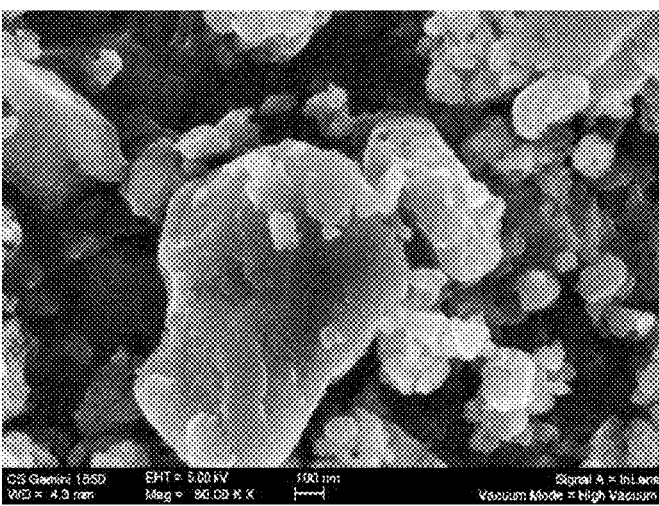

FIGS. 2A and 2B illustrate SEM images of Comparative Example after soaking in artificial saliva for 47 days (much longer than the seven day study for Example Composition 9 from FIGS. 1A-1I). Though a calcite ($CaCO_3$) phase started to form after 47 days soaking in artificial saliva, the Comparative Example showed no hydroxyapatite formation even after 61 days in artificial saliva. As specified by ASTM F1538-03, bioactive materials only refer to those that can form apatite in vitro or in vivo. The formation of calcite does not produce a direct bond with bony tissues due to its chemical difference from bone; thus, calcite is not regarded as bioactive. FIGS. 2A and 2B provide morphological evidence of a typical calcite phase in the Comparative Example after 47 days. The inclusion of high concentrations of CaO and $P_2O_5$ oxides in the example compositions ensures the formation of an apatite phase in artificial saliva while the comparative composition (which has appreciably lower concentrations of CaO and $P_2O_5$) only forms a calcite phase. The slow (i.e., negligible) conversion to hydroxyapatite and the formation of calcite in the Comparative Example after over one month in artificial saliva suggests its relatively lower bioactivity as compared to Example Composition 9. Due to its chemical similarity with bone, apatite can form a direct bond with bony tissue while calcite cannot.

The compositions of Table 1 demonstrate a step change in bioactivity, which can be a significant advantage for cavity and hypersensitivity treatment. High CaO and $P_2O_5$ contents, along with lower $SiO_2$ quantities may account for their improved bioactivity over current reported bioactive glasses by having a ten times faster rate of apatite (e.g., hydroxyapatite) formation. Because calcium is a key component in apatite, higher CaO concentrations favor faster apatite formation. Example Composition 9 has higher concentrations of CaO than Comparative Example (42.5 wt. % versus 24.5 wt. %).

Example 3—Improved Chemical Stability

The compositions from Table 1 also demonstrate improved chemical stability over the Comparative Example. Many Example compositions fall within HGB 3 category while the Comparative Example is in HGB 5, based on the ISO 719 testing procedure. According to ISO 719, testing was conducted by measuring the amount of leached alkali ions after soaking glass grains (300-425 μm) of the Example compositions and the Comparative Example in water at 98° C. for 1 hr. HGB stands for hydrolytic resistance of glass grains under the prescribed boiling water test. A higher alkali release (higher HGB number) indicates a lower water durability (lower resistance) of the glass composition. Conversely, a lower alkali release (lower HGB number) indicates a higher water durability of the glass composition. Table 2 illustrates the ISO 719 testing results of the Example compositions and the Comparative Example.

TABLE 2

| Example | Conversion of mols leached to μg neutralized alkali (as $Na_2O$) per gram glass grain tested (μg/g) | Glass Classification per ISO 719 |
|---|---|---|
| Comp. Ex. | 871.1 | HGB 5 |
| 1 | 233.9 | HGB 3 |
| 2 | 132.2 | HGB 3 |
| 3 | 101.3 | HGB 3 |
| 4 | 88.9 | HGB 3 |
| 5 | 180.6 | HGB 3 |
| 7 | 173.1 | HGB 3 |
| 8 | 129.6 | HGB 3 |
| 9 | 113.1 | HGB 3 |

The results from Table 2 indicate a significant improvement in water durability in the Example compositions over the Comparative Example. The equivalent alkali release from the Example compositions is about one-tenth to one-fifth of that from the Comparative Example. In other words, because the equivalent alkali release from Example Nos. 1-5, 7-9 is lower than that of the Comparative Example, the Examples disclosed herein have a higher water durability. The improved hydrolytic resistance of the Example compositions (Example Nos. 1-5, 7-9) may be attributed to their lower alkali contents, higher quantities of CaO, and the addition of $ZrO_2$, as compared to the Comparative Example.

What the results in Table 2 indicate is that the higher water durability ensures a longer shelf time when being used in an aqueous solution. Dental applications utilizing the Comparative Example are currently restricted to non-aqueous solution formulations. The current Examples of Table 1, which have improved water durability, allow flexibility in formulating with both aqueous and non-aqueous solutions, making them better candidates in dental or oral care or beauty product applications.

Example 4—Measurement

Microstructures of the glass powder after soaking in artificial saliva was observed using a Zeiss Gemini 450 SEM. After applying a conductive carbon coating to the glass powder to reduce surface charging, backscattered images were obtained at 5 kV accelerating potentials on the carbon-coated, polished cross-section samples.

Crystalline phases formed in the glass powder after soaking in artificial saliva were detected using X-ray diffraction (XRD). Powder x-ray diffraction (XRD) analysis was conducted by preparing the samples by first drying and then grinding to a fine powder using a Rocklabs ring mill. The powder was then analyzed using a Bruker D4 Endeavor device equipped with a LynxEye™ silicon strip detector. X-ray scanning was conducted from 5° to 80° (2θ) for data collection.

Glass Bioactivity

Aspects are related to compositions or matrices containing embodied bioactive glass compositions and the methods of using the matrices to treat medical conditions. The matrices can be a toothpaste, mouthwash, rinse, spray, ointment, salve, cream, bandage, polymer film, oral formulation, pill, capsule, transdermal formulation, and the like. The bioactive glass compositions claimed can be physically or chemically attached to matrices or other matrix components, or simply mixed in. As noted above, the bioactive glass can be in any form that works in the application, including particles, beads, particulates, short fibers, long fibers, or woolen meshes. The methods of using the glass-containing matrices to treat a medical condition can be simply like the use of matrix as normally applied.

Glass Making Processes

Glasses having the oxide contents listed in Table 1 can be made via traditional methods. For example, in some examples, the precursor glasses can be formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1100° C. to 1400° C. for times ranging from about 6 hours to 24 hours. The melts can thereafter be poured into steel molds to yield glass slabs. Subsequently, those slabs can be transferred immediately to an annealer operating at about 400° C. to 700° C., where the glass is held at temperature for about 0.5 hour to 3 hours and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to 1400° C. and held at temperature for about 6 hours to 16 hours. The resulting glass melts are then poured onto a steel table to cool. The precursor glasses are then annealed at appropriate temperatures.

The embodied glass compositions can be ground into fine particles in the range of 1-10 microns (μm) by air jet milling or short fibers. The particle size can be varied in the range of 1-100 μm using attrition milling or ball milling of glass frits. Furthermore, these glasses can be processed into short fibers, beads, sheets or three-dimensional scaffolds using different methods. Short fibers are made by melt spinning or electric spinning; beads can be produced by flowing glass particles through a hot vertical furnace or a flame torch; sheets can be manufactured using thin rolling, float or fusion-draw processes; and scaffolds can be produced using rapid prototyping, polymer foam replication and particle sintering. Glasses of desired forms can be used to support cell growth, soft and hard tissue regeneration, stimulation of gene expression or angiogenesis.

Continuous fibers can be easily drawn from the claimed composition using processes known in the art. For example, fibers can be formed using a directly heated (electricity passing directly through) platinum bushing. Glass cullet is loaded into the bushing, heated up until the glass can melt. Temperatures are set to achieve a desired glass viscosity (usually <1000 poise) allowing a drip to form on the orifice in the bushing (Bushing size is selected to create a restriction that influences possible fiber diameter ranges). The drip is pulled by hand to begin forming a fiber. Once a fiber is established it is connected to a rotating pulling/collection drum to continue the pulling process at a consistent speed. Using the drum speed (or revolutions per minute RPM) and glass viscosity the fiber diameter can be manipulated—in general the faster the pull speed, the smaller the fiber diameter. Glass fibers with diameters in the range of 1-100 μm can be drawn continuously from a glass melt. Fibers can also be created using an updraw process. In this process, fibers are pulled from a glass melt surface sitting in a box furnace. By controlling the viscosity of the glass, a quartz rod is used to pull glass from the melt surface to form a fiber. The fiber can be continuously pulled upward to increase the fiber length. The velocity that the rod is pulled up determines the fiber thickness along with the viscosity of the glass.

Thus, as presented herein, biocompatible inorganic compositions for consumer and dental applications are described having a combination of improved bioactivity and chemical durability in aqueous environments.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

References herein to the positions of elements (e.g., "top," "bottom," "above," "below," "first," "second," etc.) are merely used to describe the orientation of various elements in the FIGURES. It should be noted that the orientation of various elements may differ according to other exemplary embodiments, and that such variations are intended to be encompassed by the present disclosure. Moreover, these relational terms are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. As used herein, the indefinite articles "a," "an," and the corresponding definite article "the" mean "at least one" or "one or more," unless otherwise specified. It also is understood that the various features disclosed in the specification and the drawings can be used in any and all combinations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Unless otherwise specified, all compositions are expressed in terms of as-batched weight percent (wt. %). As will be understood by those having ordinary skill in the art, various melt constituents (e.g., silicon, alkali- or alkaline-based, boron, etc.) may be subject to different levels of volatilization (e.g., as a function of vapor pressure, melt time and/or melt temperature) during melting of the constituents. As such, the as-batched weight percent values used in relation to such constituents are intended to encompass values within ±0.5 wt. % of these constituents in final, as-melted articles. With the forgoing in mind, substantial compositional equivalence between final articles and as-batched compositions is expected.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A silicate-based glass composition, comprising:
15-65 wt. % $SiO_2$,
15-50 wt. % CaO,
10-30 wt. % $P_2O_5$,
1-20 wt. % $ZrO_2$, and
0-7 wt. % MgO,
wherein the composition has a hydrolytic resistance of glass grains (HGB) of at most 3, when measured by International Organization for Standardization section 719 (ISO 719), and forms a bioactive crystalline phase in simulated body fluid.

2. The glass composition of claim 1, comprising:
15-45 wt. % $SiO_2$,
30-50 wt. % CaO, and
2-15 wt. % $ZrO_2$.

3. The glass composition of claim 2, further comprising 3-6 wt. % MgO.

4. The glass composition of claim 2, further comprising 10-20 wt. % SrO.

5. The glass composition of claim 2, further comprising 10-20 wt. % ZnO.

6. The glass composition of claim 1, further comprising >0-6 wt. % MgO.

7. The glass composition of claim 1, further comprising >0-25 wt. % SrO.

8. The glass composition of claim 1, further comprising >0-25 wt. % ZnO.

9. The glass composition of claim 1, wherein the glass comprises:
15-50 wt. % MO, and
0-30 wt. % $R_2O$,
wherein MO is the sum of MgO, CaO, SrO, BeO, and BaO, and $R_2O$ is the sum of $Na_2O$, $K_2O$, $Li_2O$, $Rb_2O$, and $Cs_2O$.

10. The glass composition of claim 1, wherein the bioactive crystalline phase comprises apatite.

11. The glass composition of claim 10, wherein the apatite is hydroxyapatite.

12. The glass composition of claim 1, wherein a sum of $P_2O_5$ and CaO is from 25-65 wt. %.

13. The glass composition of claim 1, wherein the simulated body fluid is an artificial saliva.

14. A matrix comprising the glass composition of claim 1, wherein:
the glass composition is attached to the matrix or mixed therein, and
the matrix includes at least one of: a toothpaste, mouth-wash, rinse, spray, ointment, salve, cream, bandage, polymer film, oral formulation, pill, capsule, or trans-dermal formulation.

15. An aqueous environment comprising the glass composition of claim 1.

16. A silicate-based glass composition, comprising:
15-45 wt. % $SiO_2$,
30-60 wt. % CaO,
10-30 wt. % $P_2O_5$, and
2-15 wt. % $ZrO_2$, and
0-7 wt. % MgO,
wherein the composition has a hydrolytic resistance of glass grains (HGB) of at most 3, when measured by International Organization for Standardization section 719 (ISO 719), and forms an apatite crystalline phase in an artificial saliva, and
wherein a sum of $P_2O_5$ and CaO is from 25-65 wt. %.

17. The glass composition of claim 16, further comprising 3-6 wt. % MgO.

18. The glass composition of claim 16, further comprising 10-20 wt. % SrO.

19. The glass composition of claim 16, further comprising 10-20 wt. % ZnO.

20. The glass composition of claim 16, wherein the apatite is hydroxyapatite.

* * * * *